United States Patent
Li

(10) Patent No.: US 9,418,128 B2
(45) Date of Patent: Aug. 16, 2016

(54) LINKING DOCUMENTS WITH ENTITIES, ACTIONS AND APPLICATIONS

(71) Applicant: Microsoft Technology Licensing, LLC, Redmond, WA (US)

(72) Inventor: Kang Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 14/304,641

(22) Filed: Jun. 13, 2014

(65) Prior Publication Data
US 2015/0363476 A1    Dec. 17, 2015

(51) Int. Cl.
*G06F 17/30* (2006.01)

(52) U.S. Cl.
CPC .... *G06F 17/30569* (2013.01); *G06F 17/30864* (2013.01)

(58) Field of Classification Search
USPC ......................................................... 707/722
See application file for complete search history.

(56) References Cited

U.S. PATENT DOCUMENTS

| | | | |
|---|---|---|---|
| 8,533,174 B2 | 9/2013 | Jung et al. | |
| 8,589,911 B1 | 11/2013 | Sharkey et al. | |
| 2006/0069666 A1 | 3/2006 | Burke et al. | |
| 2007/0067285 A1* | 3/2007 | Blume | G06Q 10/10 |
| 2010/0076972 A1* | 3/2010 | Baron | G06F 17/3071 707/736 |
| 2012/0117058 A1 | 5/2012 | Rubinstein et al. | |
| 2012/0197862 A1* | 8/2012 | Woytowitz | G06F 17/30731 707/710 |
| 2012/0284247 A1 | 11/2012 | Jiang et al. | |
| 2012/0323898 A1 | 12/2012 | Kumar et al. | |
| 2013/0018867 A1 | 1/2013 | Regan et al. | |
| 2013/0031075 A1 | 1/2013 | El Daher et al. | |
| 2013/0090956 A1 | 4/2013 | Ripsher et al. | |
| 2013/0173604 A1 | 7/2013 | Li et al. | |
| 2013/0173639 A1 | 7/2013 | Chandra et al. | |
| 2013/0218866 A1 | 8/2013 | Qian et al. | |
| 2013/0268507 A1 | 10/2013 | Macbeth et al. | |
| 2013/0304729 A1 | 11/2013 | Jiang et al. | |
| 2014/0067931 A1* | 3/2014 | Harik | H04L 67/306 709/204 |
| 2015/0286747 A1* | 10/2015 | Anastasakos | G06F 17/30917 707/776 |

(Continued)

FOREIGN PATENT DOCUMENTS

WO    2012160567 A1    11/2012

OTHER PUBLICATIONS

Demartini, et al., "A Model for Ranking Entities and Its Application to Wikipedia", In Conference of Latin American Web, Oct. 28, 2008, 10 pages.

(Continued)

*Primary Examiner* — Cam-Linh Nguyen
(74) *Attorney, Agent, or Firm* — Dave Ream; Michelle Crosslin-Webb; Micky Minhas

(57) ABSTRACT

Individuals often perform search queries with the intent of performing a particular action based on the search results. In an embodiment, mentions are identified in a document and candidate entities for the mention are identified. Confidence scores for mention-entity pairs are determined based on relationships between candidate entities, and entities are selected based on the scores. Selected entities are ranked indicating their relevance to a topic of the document. Actions associated with the selected entities are identified. Based on an intent of a search query that returned the document in search results, relevant actions are selected and links are presented within the search results to applications that perform the actions.

20 Claims, 12 Drawing Sheets

(56) References Cited

U.S. PATENT DOCUMENTS

2015/0294007 A1* 10/2015 Chen .................. G06F 17/3043
                                                    707/749
2015/0324459 A1* 11/2015 Chhichhia ......... G06F 17/30705
                                                    706/12

OTHER PUBLICATIONS

Han, et al., "Collective Entity Linking in Web Text: A Graph-Based Method", In Proceedings of the 34th international ACM SIGIR conference on Research and development in Information Retrieval, Jul. 24, 2011, 10 pages.

Di, et al., "Representing a Web Page as Sets of Named Entities of Multiple Types—A Model and Some Preliminary Applications", In Proceedings of the 17th international conference on World Wide Web, Apr. 21, 2008, 2 pages.

Lin, et al., "Active Objects: Actions for Entity-Centric Search", In Proceedings of the 21st international conference on World Wide Web, Apr. 16, 2012, 10 pages.

U.S. Appl. No. 13/905,041, Gordner, et al., "Surfacing Direct App Actions", filed May 29, 2013.

* cited by examiner

LINKING DOCUMENTS WITH ENTITIES, ACTIONS AND APPLICATIONS

BACKGROUND OF THE INVENTION

Users of the Internet often perform online searches with the intent of performing a particular action, or task, such as making a dinner reservation, viewing an online movie, buying a book, booking a trip, among others. For example, a user who desires to buy tickets for a concert may perform a search to find a ticket order website. The user may then navigate to the ticket order website to, among other things, locate particular pages or links that enable the user to perform such actions as select seats, submit payment information, and so forth.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. At a high level, documents are linked with entities, and actions. In an embodiment, possible mentions of entities are identified in a document, and potential candidate entities to which each mention may refer are identified. A pre-assigned confidence score for each mention-entity pair is updated based on relationships between the candidate entities, and entities are selected from mention-entity pairs having scores above a threshold. The selected entities are ranked to indicate a relevance of the entities to a topic of the document. Actions are identified that are associated with the selected entities, utilizing a repository that stores associations between entities and actions that can be performed on the entities. In one embodiment, the process of linking documents and entities to actions occurs in conjunction with a process of web crawling to develop a searchable index of web documents. Indications of the identified entities and actions may be "stamped" onto the web documents in the index such that the information is available when searching the web index. For example, an intent of a search query that generated search results including a document may be identified. Based on the intent of the search query, relevant actions are selected from the identified actions that were associated with the document during the entity linking process. Links may be presented within the search results to applications that perform the selected actions.

BRIEF DESCRIPTION OF THE DRAWINGS

Some embodiments of the invention are described in detail below with reference to the attached drawing figures, wherein.

DETAILED DESCRIPTION

Figure 1:
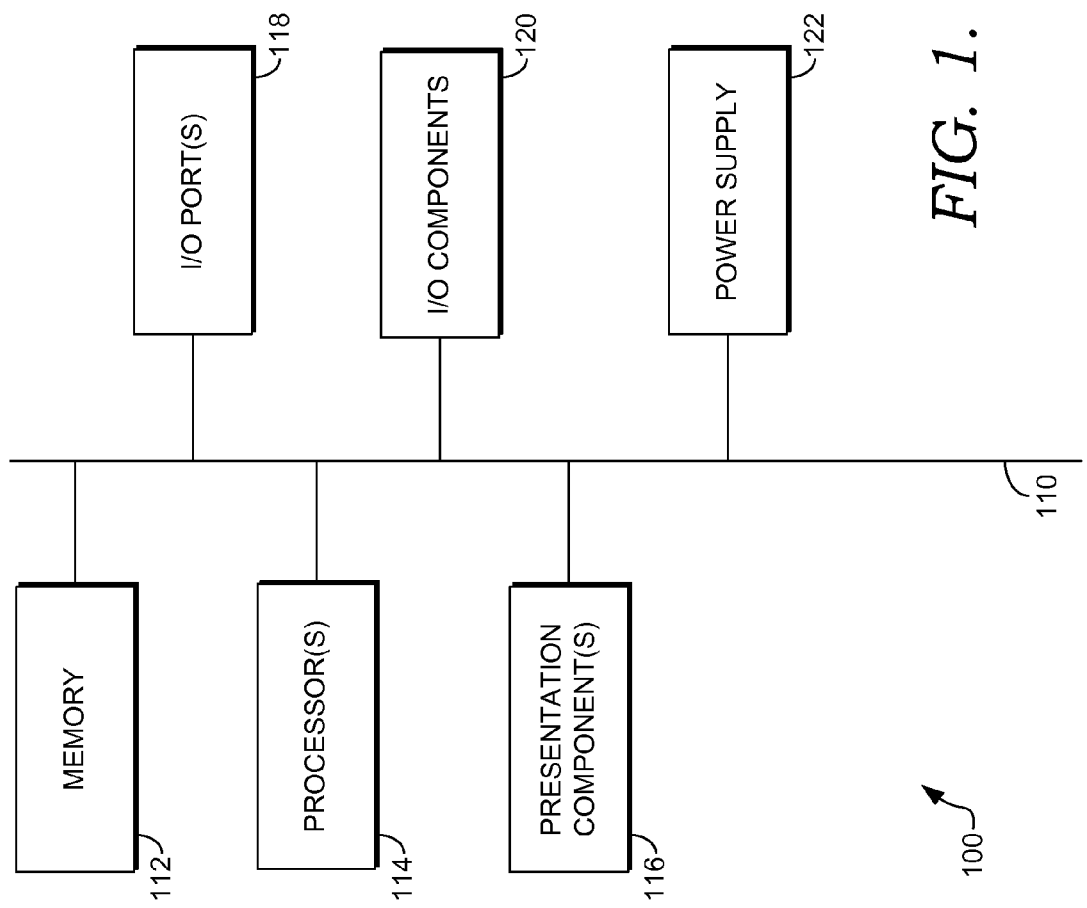
FIG. 1 is an exemplary operating environment suitable for use with an embodiment of the present invention.

The subject matter of embodiments of the invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

ASIC Program-Specific Integrated Circuit
AS SP Program-Specific Standard Product
CD-ROM Compact-Disc Read-Only Memory
CPLD Complex Programmable Logic Device
DFA Deterministic Finite Automaton
DU Document Understanding
DVD Digital Versatile Disc/Digital Versatile Disc
EEPROM Electronically Erasable Programmable Read-Only Memory
FPGA Field-Programmable Gate Array
I/O Input/Output
ID Identifier
IDF Inverse Document Frequency
MP3 Moving Picture Experts Group (MPEG)-1 Or MPEG-2 Audio Layer III
RAM Random-Access Memory
ROM Read-Only Memory
SOC System-On-A-Chip System
UInt32 32-Bit Unsigned Integer
URL Universal Resource Locator As described briefly above, in one embodiment, entity mentions in a document are identified and candidate entities are identified for each mention. As used herein, an entity generally refers to a thing or object, including physical objects and abstract concepts. Examples of entities include "Barack Obama," "Seattle, Wash.," and "telephone," which are all physical "objects." An entity is more precisely described as a semantic data object that is uniquely identifiable, and that possesses a collection of attributes based on the attributes of the real-world object or thing it represents. For example, the entity "person" may have the attributes "age," "profession," "gender," "city," and so forth. Entities also have connections, or relationships, with other entities. For example, a person may be connected to a city of residence. A person may also be connected to a place of employment, such as a corporation. For instance, Harry Shum is an Executive Vice President at Microsoft Corporation, thus the entity "Harry Shum" has a connection with the entity "Microsoft Corporation."

Mention spotting is the process of identifying the occurrence of possible entities that are mentioned in a document. As used herein, a "mention" is an occurrence in a document of a text string, or n-gram, which may refer to an entity. For example, the word "Portland" in a document may refer to the entity "Portland, Oreg." However, it may instead refer to "Portland, Me." In either case, the word "Portland" in a document could qualify as a mention during the process of mention spotting, even though the actual entity to which it refers may be ambiguous. In an embodiment, the process of mention spotting identifies mentions without disambiguating them.

Entity linking is the task of determining the identity of the mentions in a document. In an embodiment, determining the identity includes matching the mentions to corresponding entities stored in a knowledge base, or knowledge repository, which also stores attributes and other information related to each entity. The task of determining the identity of mentions may also be referred to as disambiguation. For a human, disambiguation of a mention may be trivial. When a human spots the word "Portland" in a document, the associated entity may be instantly apparent from the context or topic of the page. The presence of the words "Oregon" or "Maine" in the document, or other named entities associated with Portland, Oreg., or Portland Me., could serve to disambiguate "Portland." For a machine, disambiguation is not necessarily trivial. However, by storing associations, or relationships, between various entities in a knowledge base, a machine may be able to disambiguate a mention based on the presence of related entities named within the same document. For example, if a knowledge base stores the entity "Portland," the entity "Oregon," and the entity "Portland, Oregon," and also indicates that the entities are related, a machine may spot the mentions "Portland" and "Oregon," access the knowledge base to discover the relationship, and identify "Portland" as a reference to the entity "Portland, Oreg."

A knowledge base may also store information about types of actions that may be performed on entities, such as "playing" an MP3 file, "purchasing" a concert ticket, "opening" an image, and so forth. For each type of action, a knowledge base may also store an indication of various applications that may be employed to perform an action. As used herein, the term "application" does not connote a particular platform, but refers to applications and/or "apps" regardless of whether they run on a mobile device, computer, server, and so forth.

Once the entities associated with a document have been identified, access may then be provided to an application to perform an action on one of the identified entities. For example, in an embodiment, a user may submit a search query that generates search results including links to various web pages related to the query. By identifying the entities mentioned in the web pages, related actions and applications may also be identified. Based on a determination of the main topic (or topics) of a web page, and which of the entities are relevant to the main topic, a link may be provided in the search results to an application that performs an action associated with one or more of the relevant entities or topics. In the event that multiple actions are associated with a particular entity, the user's search query may be analyzed to determine the user's intent, and an action relevant to the intent may be selected from among the plurality of associated actions.

In a first aspect, a method of entity linking is provided. Mentions of entities within a document are identified. Candidate entities associated with each mention are identified. Mention-entity pairs are defined for each mention and the associated candidate entities. A confidence score is identified for each mention-entity pair. Relationships between the candidate entities are identified. For each mention-entity pair, the confidence score is updated based on the relationships between the associated candidate entity and the candidate entities associated with other mention-entity pairs. Candidate entities are selected from the mention-entity pairs based on the updated confidence scores. The selected entities are ranked, where the ranking indicates a relevance of the selected entities to a topic of the document.

In a second aspect, a method of entity linking is provided. Mentions of entities within a document are identified. Candidate entities corresponding to each mention are identified. For each mention and corresponding candidate entity, the mention and the corresponding candidate entity form a mention-entity pair. When an overlapping matching technique was utilized to identify the mentions, then overlapping consecutive mentions form a mention group, where for each mention group and corresponding mention-entity pair, the mention group and the corresponding mention-entity pair form a group-mention-entity triple. A prior confidence score for each mention-entity pair is identified. A graph is constructed. The graph consists of a set of nodes (also known as "vertices"), where some pairs of nodes are connected by directional edges (also known as "arcs"). Each node in the graph corresponds to a mention-entity pair or a group-mention-entity triple, and each node is assigned the prior confidence score of a corresponding mention-entity pair as a node score. Edges are constructed in the graph between nodes that have relationships between each other, where the relationships between nodes correspond to relationships between the candidate entities in the mention-entity pairs. The relationship between two entities may be unidirectional or bidirectional, hence an edge between two nodes may be unidirectional or bidirectional. An edge directed from a node A to a node B is called an outgoing edge of node A and an incoming edge of node B. Each edge directed from a node A to a node B is assigned an edge score indicating the strength of the relationship from node A to node B. For each node, the node score is updated as a function of the node score and the edge scores of incoming and outgoing edges for the node. The nodes are sorted in descending order of the node scores. Nodes are selected according to a selection process such that nodes having node scores above a preset threshold are selected, starting from the node having the greatest node score. As each node is selected, any nodes that are mutually exclusive with the selected node are eliminated from the selection process. Output entities are generated corresponding to the selected nodes. The output entities are grouped into clusters. The output entities are ranked based on relevance to a topic of the document.

In a third aspect, a method of entity linking is provided. A mention-entity mapping is provided that maps mentions of entities to possible candidate entities, where an association between a mention and a candidate entity forms a mention-entity pair. The mention-entity mapping associates a prior confidence score for each mention-entity pair. An entity connection mapping is provided that that identifies connections between entities. An entity property mapping is provided that maps entities to entity types, properties, and actions. A document returned in search results is accessed. Mentions of entities in the document are identified. Candidate entities corresponding to each mention are identified based on the mention-entity mapping. The prior confidence score is identified for each mention-entity pair associated with the identified mentions, based on the mention-entity mapping. A graph is constructed, which consists of a set of nodes and a set of directional edges. Each node corresponds to a mention-entity pair, and each node is assigned the prior confidence score of the mention-entity pair as a node score. Edges are constructed in the graph between two or more nodes that correspond to different mentions. Each edge represents a connection between two nodes in the graph, and each edge is assigned an edge score that represents strength of the connection. For each node, the node score is updated as a function of the prior node score and the edge scores of incoming and outgoing edges for the node. The nodes are sorted in descending order of the node scores. Nodes are selected according to a selection process such that nodes having node scores above a preset threshold are selected, starting from the node having the greatest node score. As each node is selected, any nodes that are mutually exclusive with the selected node are eliminated from the selection process. Output entities are generated corresponding to the selected nodes. The output entities are grouped into clusters, and the output entities are ranked.

Referring initially to FIG. 1 in particular, an exemplary operating environment for implementing an embodiment of the present invention is shown and designated generally as computing device 100. Computing device 100 is but one example of a suitable computing environment and is not intended to suggest any limitation as to the scope of use or functionality of invention embodiments. Neither should the computing environment 100 be interpreted as having any dependency or requirement relating to any one or combination of components illustrated.

An embodiment of the invention may be described in the general context of computer code or machine-useable instructions, including computer-executable instructions such as program modules, being executed by a computer or other machine, such as a personal data assistant or other mobile or wearable device. Generally, program modules including routines, programs, objects, components, data structures, and the like, refer to code that perform particular tasks or implement particular abstract data types. An embodiment of the invention may be practiced in a variety of system configurations, including mobile devices, consumer electronics, general-purpose computers, more specialty computing devices, etc. An embodiment of the invention may also be practiced in distributed computing environments where tasks are performed by remote-processing devices that are linked through a communications network. Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and so forth.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 includes a variety of computer-readable media. Computer-readable media can be any available media that may be accessed by computing device 100 and includes both volatile and nonvolatile media, and removable and non-removable media. By way of example only, computer-readable media may comprise computer storage media and/or communication media. Computer storage media includes both volatile and nonvolatile media, and removable and non-removable media implemented in any method or technology for the storage of information such as computer-readable instructions, data structures, program modules, or other data. Computer storage media includes, but is not limited to, random-access memory (RAM), read-only memory (ROM), electronically erasable programmable read-only memory (EEPROM), flash memory or other memory technology, compact-disc read-only memory (CD-ROM), digital versatile discs (DVDs) or other optical disc storage, magnetic cassettes, magnetic tape, magnetic disc storage or other magnetic storage devices, or any other medium that can be used to store the desired information and that can be accessed by computing device 100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example only, communication media includes wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware memory devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative I/O components include a microphone, joystick, game pad, satellite dish, scanner, printer, wireless device, etc. I/O components 120 may enable interaction with computing device 100 via standard controllers, air gestures, voice, or a companion device such as a smartphone or a tablet, among other means.

Figure 2:
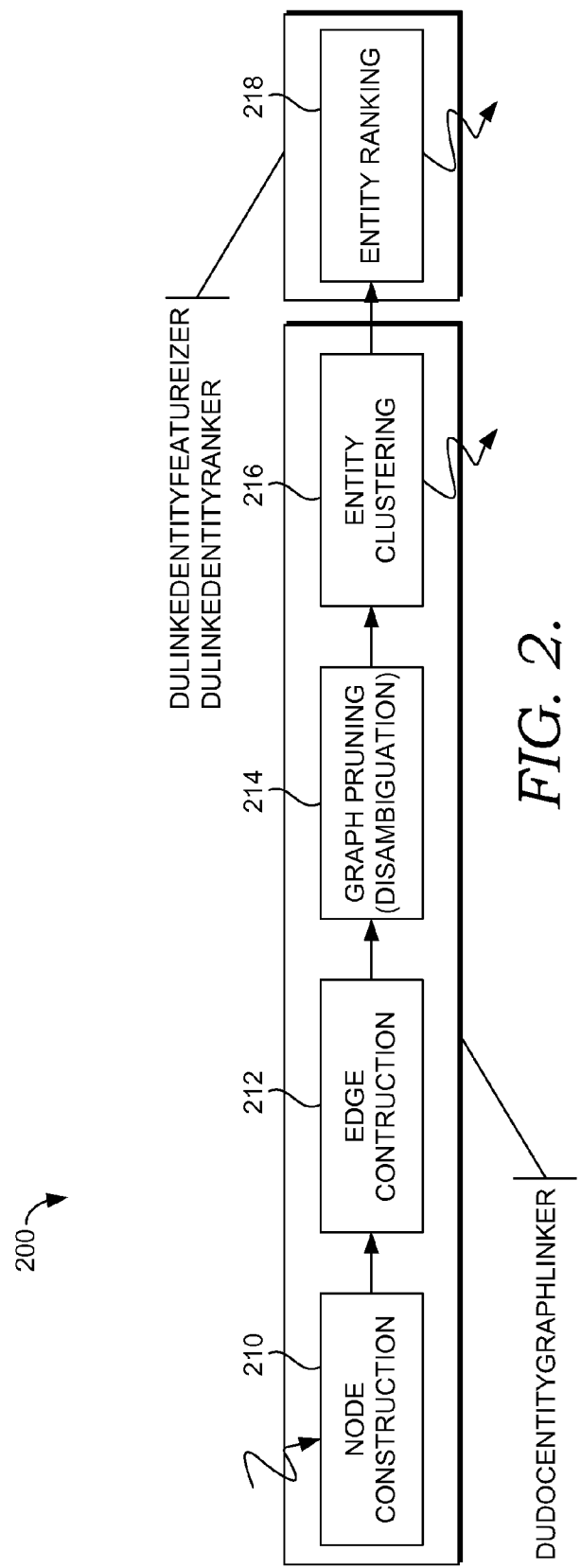
FIG. 2 is a block diagram of an exemplary processing pipeline suitable for use with an embodiment of the present invention.

Referring now to FIG. 2, an exemplary processing pipeline suitable for use with an embodiment of the present invention is shown and designated generally as document understanding (DU) pipeline 200. DU pipeline 200 is but one example of a suitable pipeline and is not intended to suggest any limitation as to the scope of use or functionality of invention embodiments. Neither should DU pipeline 200 be interpreted as having any dependency or requirement relating to any one or combination of components illustrated.

In an embodiment, DU pipeline 200 implements an entity linking process in C++ as a collection of processes, or elements, and may include or access one or more computing devices, servers, network devices, and databases implemented in computer storage media. C++ is an exemplary programming language for implementing DU pipeline 200, but some embodiments may use one or more other programming languages. As depicted, DU pipeline 200 includes a node construction element 210, an edge construction element 212, a disambiguation element 214, an entity clustering element 216, and an entity ranking element 218. In one embodiment, one or more of the elements in DU pipeline 200 utilize various model files including a mention-entity lookup table, an entity connection lookup table, an entity property lookup table, and a type name lookup table, which are described below.

In an embodiment, DU pipeline 200 runs "offline," i.e., independently of users' search queries. The node construction, edge construction, disambiguation, entity clustering, and entity ranking may occur in conjunction with a process of web crawling to develop a searchable index of web documents. Indications of the identified entities can be "stamped" onto the web documents in the index such that the information is available in real time when a user is performing a web search. Some portions of FIG. 2 are described herein with respect to FIGS. 3, 4, and 5.

Node Construction

In an embodiment, entity linking utilizes a graph to represent candidate entities associated with mentions in a document, and to disambiguate the mentions, i.e., determine the candidate entities to which the mentions actually refer. As used herein, the term "graph" includes memory data structures that represent graph relationships. The term "graph" does not require that a visual representation of a graph be generated or presented to a user. Likewise, the acts of constructing a graph and performing operations on a graph include operations that are performed on data and/or data structures representing a graph.

With further reference to FIG. 2, node construction element 210 constructs graph nodes through the process of mention spotting, in which an input document is scanned for possible mentions of entities. In an embodiment, node construction element 210 utilizes a mention-entity lookup table that maps entity mentions to possible entity candidates, which are entities to which the mentions may refer. Each mention can map to one or more entity candidates. For example, the mention "spring" may refer to the season spring, to a mechanical spring, or to a spring of flowing water, among others. The mention "Harry Shum" may refer to the Microsoft Corporation executive Harry Shum, or to the actor Harry Shum, Jr.

Each entity in the mention-entity lookup table may be identified with a unique identifier. A mention and an associated entity form a mention-entity pair. For a given mention, if there are three candidate entities, then there are three mention-entity pairs, each containing the mention and one candidate entity. The mention-entity lookup table may also store respective scores corresponding to the candidate entities for a given mention, i.e., for each mention-entity pair. The score of each candidate entity for a given mention-entity pair represents $p(e_i|m_j)$, i.e., the prior probability of mention $m_j$ referring to entity $e_i$ given the condition that $m_j$ appears in the document.

When a possible mention is spotted, the mention-entity lookup table may be utilized to retrieve the candidate entity IDs associated with the mention and the respective scores corresponding to the mention-entity pairs. Mention spotting and candidate entity ID lookup may be done through a variety of methods such as scanning the input text with an in-memory deterministic finite automaton (DFA), building an inverted index from the input text, or any other string searching algorithms. Two different mention spotting schemes are described below. Some embodiments of the present invention may use one, or both, of the mention spotting schemes described herein. Other embodiments may use other schemes or methods for spotting mentions within a document.

Non-Overlapping Longest Match

In one embodiment, mention spotting is done using a technique referred to herein as non-overlapping longest match. In this embodiment, the mention spotter detects each new mention starting from the end of the previously detection mention. Hence, the detected mentions would never overlap. When non-overlapping longest match is utilized, the graph for a document is constructed such that each node in the graph corresponds to a mention-entity pair. For example, suppose three mentions were spotted (denoted as m1, m2, and m3) in a document, with each mention corresponding to a mention in the list of candidate entities in the mention-entity lookup table depicted in Table 1. The first column in Table 1 represents mentions. The second column represents candidate entity IDs associated with each mention, i.e., entities to which the mention possibly refers. The third column represents probability scores associated respectively with the candidate entities for a given mention. For example, for entity m1, the probability that mention m1 refers to entity e1 is 0.8; the probability that entity m1 refers to entity e2 is 0.12; and the probability that entity m1 refers to entity e3 is 0.08. In some embodiments, the scores may be probabilities on a scale from zero to one, whereas in other embodiments different formats may be utilized to indicate a strength or likelihood that a mention refers to a particular entity.

In an embodiment, the scores are determined by either or both of two complementary methods: 1) based on query clicks, and 2) based on hyperlinks in a hypertext corpus such as Wikipedia. For the method based on query clicks, when a user issues query $q_j$ and clicks on a URL in the search result, if the URL is a source URL of entity $e_i$ (each entity in the knowledge repository may have a set of predetermined source URLs, which may have been manually or automatically determined), then the mapping from $q_j$ to $e_i$ is recorded in the search log. Many such mappings are recorded. When aggregated over a period of time, a table can be generated that contains ($q_j$, $e_i$, count($q_j$, $e_i$)), where count($q_j$, $e_i$) is the number of times the pair ($q_j$, $e_i$) appears in the log. The table may be filtered to remove ($q_j$, $e_i$) pairs that have relatively small counts. The remaining items will form a ($m_j$, $e_i$, count($m_j$, $e_i$)) table. The score may be determined as count($m_j$, $e_i$)/count ($m_j$). For the method based on hyperlinks, a hyperlink in a hypertext corpus such as Wikipedia contains anchor text $a_j$ and a link to a target entity $e_i$. Similar to the query based method, count($a_j$, $e_i$) can be obtained, noise filtered out, and a table of ($m_j$, $e_i$, count($m_j$, $e_i$)) generated. The scores may then be determined in the same way as for the first method. Some embodiments may employ variations of these or other methods for determining probability scores associated with candidate entities.

TABLE 1

Mention-Entity Lookup Table

| Mention | Candidate Entity IDs | Scores |
|---------|----------------------|--------|
| m1 | e1, e2, e3 | 0.8, 0.12, 0.08 |
| m2 | e2, e4 | 0.6, 0.4 |
| m3 | e5, e6, e7 | 0.7, 0.26, 0.04 |
| m4 | e8, e9 | 0.9, 0.1 |

Figure 3:
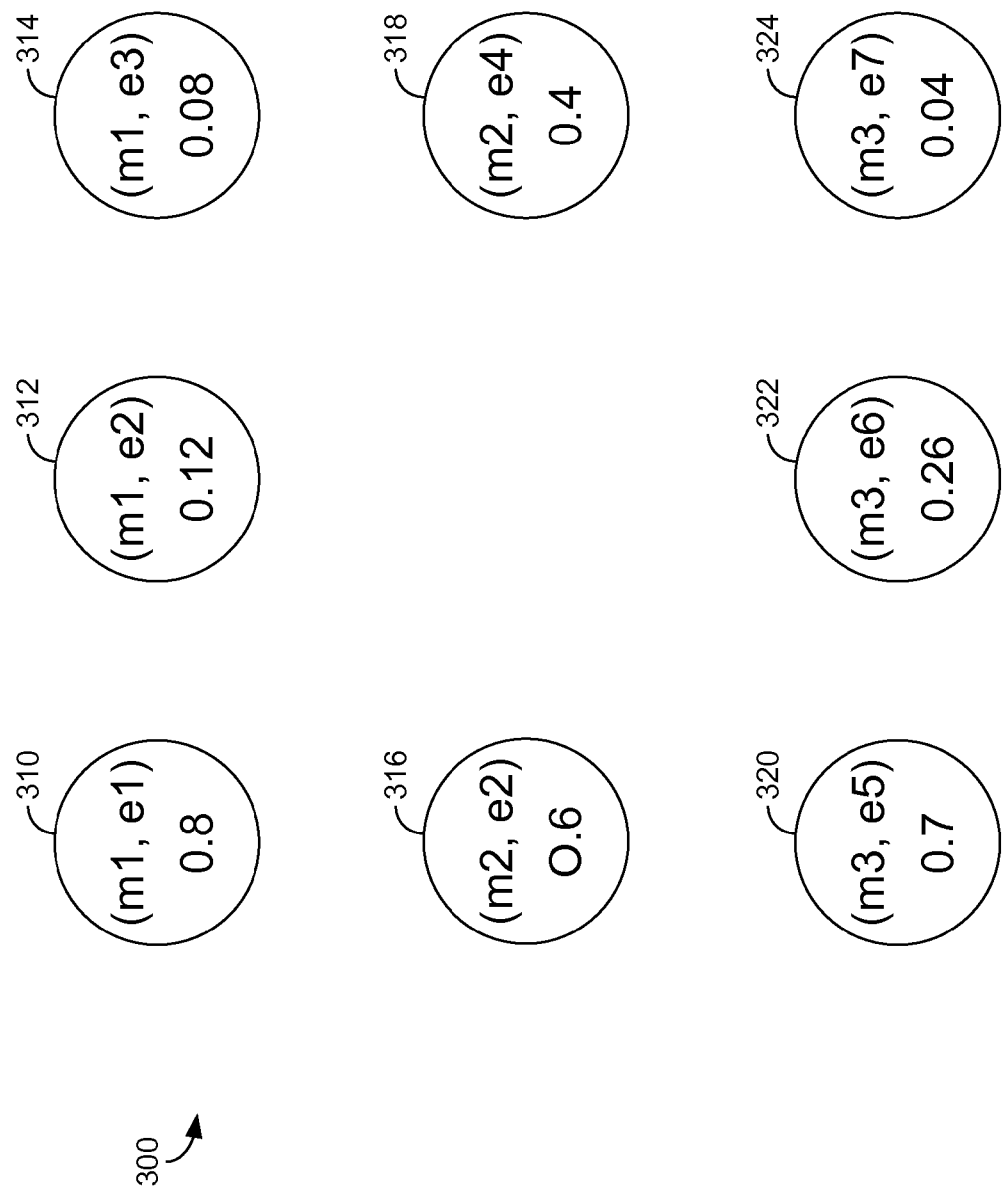
FIGS. 3-5 are exemplary graphs suitable for use with exemplary embodiments of the present invention.

FIG. 3 depicts an exemplary graph constructed from mentions m1, m2, and m3, and their associated candidate entities from Table 1. The exemplary graph is suitable for use with an embodiment of the present invention, and is designated generally as graph 300. Graph 300 is but one example of a suitable graph and is not intended to suggest any limitation as to the scope of use or functionality of invention embodiments. Neither should graph 300 be interpreted as having any dependency or requirement relating to any one or combination of components illustrated. As depicted, graph 300 includes nodes 310, 312, 314, 316, 318, 320, 322, and 324.

Each node in graph 300 represents a mention-entity pair described in the example given above with respect to Table 1. Nodes 310, 312, and 314, respectively, correspond to the mention-entity pairs m1:e1, m1:e2, and m1:e3. Nodes 316 and 318, respectively, correspond to the mention-entity pairs m2:e2 and m2:e4. Nodes 320, 322, and 324, respectively, correspond to the mention-entity pairs m3:e5, m3:e6, and m3:e7. Additionally, graph 300 depicts within each graph node the probability score associated with the respective mention-entity pair (e.g., 0.8, 0.12, and so forth)). The score assigned to a graph node at this step is referred to as a prior node score, reflecting the fact that it represents the probability that a mention refers to a given entity prior to updating the score. The scores may be updated in a graph pruning step by combining them with edge scores that represent the strength of relationships between various nodes in the graph, as described more fully below.

Overlapping Longest Match

The non-overlapping longest match technique described above may overlook potential mentions in some cases due to finite coverage of alternative mentions of an entity in the mention-entity lookup table. For example, suppose a document being scanned for mentions contains the text:

Former managing director of Microsoft Research Asia, Dr. Harry Shum, Corporate Vice President at Microsoft now, has taken the new role of . . .

Suppose the mention-entity lookup table only contains "Harry Shum" as a possible form of mention for the entity Harry Shum, and not "Dr. Harry Shum"; meanwhile, suppose the mention-entity lookup table also includes an entry that maps "Dr. Harry" to the entity Harry Cooper (veterinarian), as represented in Table 2. In this case, a non-overlapping longest match-based mention spotter would spuriously detect "Dr. Harry" (which leads to an irrelevant candidate entity) and skip "Harry Shum" (which is a better match).

TABLE 2

Mention-Entity Lookup Table

| Mention | Candidate Entity IDs |
| --- | --- |
| Harry Shum | http://knowledge.microsoft.com/cc38316d-9d1c-47bb4f69fd43 |
| ... | ... |
| Dr. Harry | http://knowledge.microsoft.com/32d0c63b-c5bf-617b19f1f014 |

In contrast to non-overlapping longest match, the overlapping longest match technique will detect "Harry Shum" as a possible mention. Overlapping longest match detects the longest match starting from each word location, rather than starting from the end of the previously detection mention. The detected mentions can hence overlap. In the example above, the overlapping longest match technique would detect both "Dr. Harry" and "Harry Shum" as possible mentions. With overlapping longest match, overlapping consecutive mentions will form a mention group. Each group-mention-entity triple forms a node in the graph.

Figure 4:
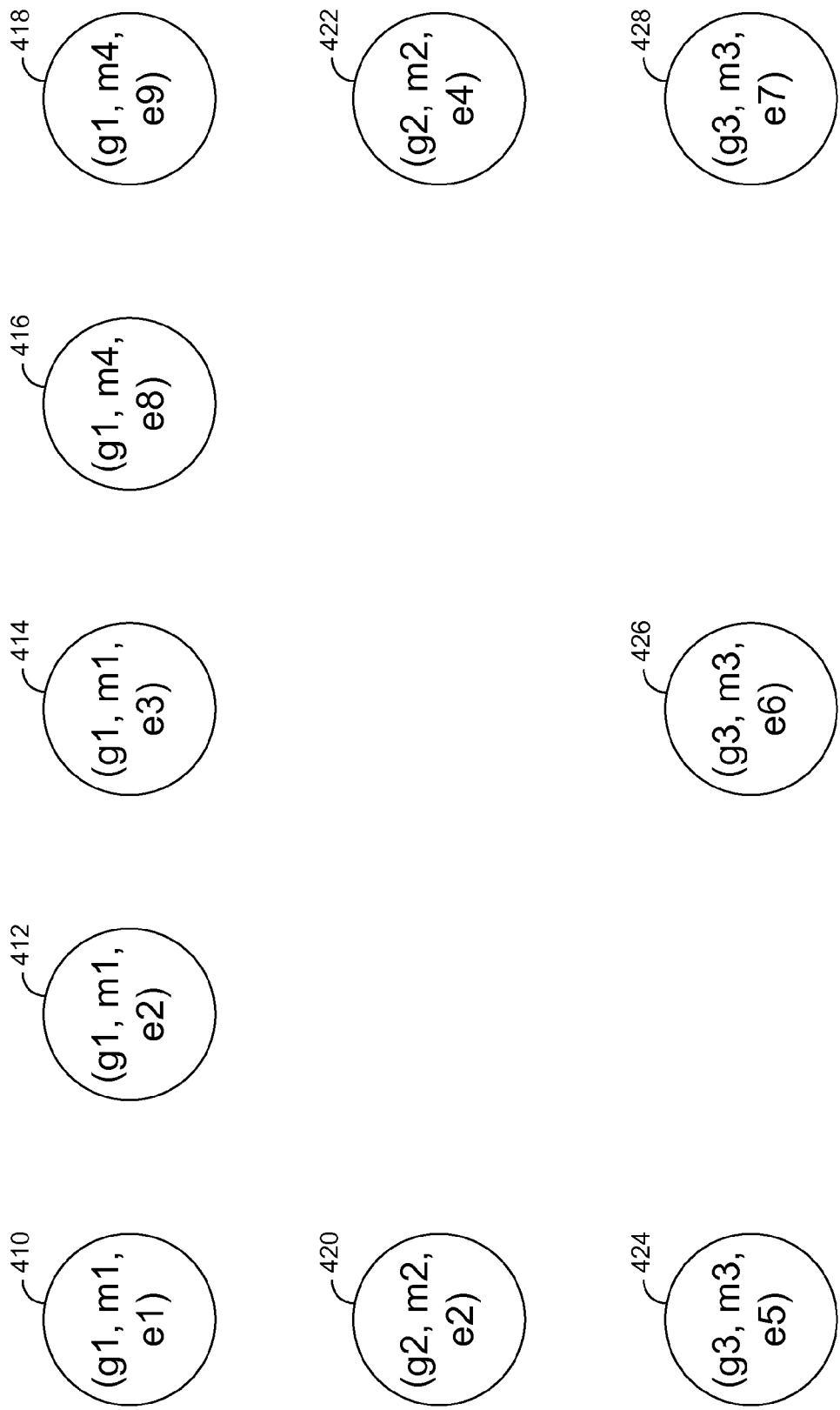

For example, suppose m1 and m4 in Table 1 are overlapping, forming a group g1. In addition, m2 and m3 are in their own groups, g2 and g3, respectively. An exemplary graph constructed from groups g1, g2, and g3 is depicted in FIG. 4, as described below. Referring now to FIG. 4, an exemplary graph suitable for use with an embodiment of the present invention is depicted, and is designated generally as graph 400. Graph 400 is but one example of a suitable graph and is not intended to suggest any limitation as to the scope of use or functionality of invention embodiments. Neither should graph 400 be interpreted as having any dependency or requirement relating to any one or combination of components illustrated. As depicted, graph 400 includes nodes 410, 412, 414, 416, 418, 420, 422, 424, 426, and 428.

Each node in graph 400 represents a group-mention-entity triple described in the example given above. Nodes 410, 412, 414, 416, and 418, respectively, correspond to the group-mention-entity triples g1:m1:e1, g1:m1:e2, g1:m1:e3, g1:m4:e8, and g1:m4:e9. Nodes 420 and 422, respectively, correspond to the group-mention-entity triples g2:m2:e2 and g2:m2:e4. Nodes 424, 426, and 428, respectively, correspond to the group-mention-entity triples g3:m3:e5, g3:m3:e6, and g3:m3:e7. Overlapping longest match usually results in more nodes in the graph compared to non-overlapping longest match. Although not depicted in FIG. 4, a graph may also include the probability score associated with the respective mention-entity pair in each node as the prior node scores. As with graph 300, prior node scores for graph 400 may be updated in a graph pruning step by combining them with edge scores that represent the strength of relationships between various nodes in the graph, as described more fully below. At the disambiguation stage, at most one mention in a group of overlapping mentions will be selected for output.

Candidate Set Expansion

Candidate set expansion is a technique that may be employed to achieve (partial) co-reference resolution, and in some cases, improve linking accuracy. For example, suppose "David Letterman" is detected as a mention in an article, which maps to the late show host, among other candidates. Later in the same article, "Letterman" is detected as another mention which maps a different set of candidates. Because "Letterman" is fully contained in (subsumed by) "David Letterman", the candidate entities of "David Letterman" will be propagated to "Letterman". This in effect increases the number of nodes corresponding to the subsumed mention, expanding its set of candidates to be considered for disambiguation. Thus, before propagation "David Letterman" has candidates e1 and e2, and "Letterman" has candidates e2, e3, and e4. Then in the graph there will be nodes ("David Letterman", e1), ("David Letterman", e2), ("Letterman", e2), ("Letterman", e3), and ("Letterman" e4). After propagation, e1 will be added as a candidate for "Letterman". So the nodes would be ("David Letterman" e1), ("David Letterman" e2), ("Letterman", e1), ("Letterman", e2), ("Letterman", e3), and ("Letterman" e4). Candidate set expansion may be implemented as an optional step which can be enabled or disabled during runtime.

Edge Construction

Referring again to FIG. 2, edge construction element 212 constructs edges between the nodes of every pair of mentions by utilizing an entity connection lookup table that identifies relationships between entities. As described above, entities may have connections or relationships with each other, such as a connection between a person and a city, or a person and a place of employment. A relationship between two entities may be directional. For instance, Harry Shum is an Executive Vice President at Microsoft Corporation, and there is a relationship from entity "Harry Shum" to the entity "Microsoft Corporation," in that the occurrence of the entity "Microsoft Corporation" would make a mention of "Harry Shum" more likely to refer to the Microsoft executive than the actor. Similarly, the occurrence of the entity "Can't Take Me Home" (music album) would make the concurring word "Pink" to be more likely to refer to the singer Alecia Beth Moore with "Pink" as her stage name.

The edges constructed in a graph encode, or represent, the relationships between graph nodes (i.e., the relationships between the entities associated with the graph nodes, as determined from the entity connection lookup table). The edges, as the relationships, are directional. For example, to generalize the examples given above, an edge from an entity ei to an entity ej indicates that an occurrence of ej in the context of ei would support the occurrence of ei (i.e., make the occurrence of ei more likely). An edge from ei to ej does not imply that there will be an edge from ej to ei. However, an edge between ei and ej may be bidirectional, in which case the occurrence of either ei or ej would support the occurrence of the other entity. The entity connection lookup table may be generated offline and compiled into a compact binary file, although other formats may be used in some embodiments.

Table 3 depicts an exemplary entity connection lookup table suitable for use with an embodiment of the present invention. In an embodiment, there is an edge, or relationship, from entity e1 to entity e4, having a score of one. Similarly, there is a relationship from entity e2 to entity e6, having a score of one, but also a relationship from entity e6 to entity e2, which indicates a bidirectional relationship between e1 and e6. The score indicates the strength of the edge, or relationship. The scores depicted in Table 3 are all "one," but in an embodiment the scores may take on a range of values to indicate a range of possible edge strengths. Similar to the prior node scores described above, the edge scores may be determined based on queries or a document corpus. In a query based method, an edge score may be determined based on a count of how often users who click on entity ei also click on entity ej in the same query session. In a document-based method, an edge score may be determined based on a count of how often a document about ei links a document about ej. Some embodiments may employ variations of these or other methods for determining probability scores associated with candidate entities.

TABLE 3

Entity Connection Lookup Table

| Edge | Score |
|---|---|
| <e1, e4> | 1 |
| <e2, e6> | 1 |
| <e2, e3> | 1 |
| <e3, e6> | 1 |
| <e6, e2> | 1 |
| <e6, e3> | 1 |

In one embodiment, the entity connection lookup table may be compiled into a binary format from a text file that is more easily readable by human. An exemplary text file is shown in Table 4, and is suitable for use with an embodiment of the present invention. Values in the Node1/Node2 columns may be internal entity IDs (e.g., UInt32 starting from 1). They may be mapped to entities in a knowledge base through an entity property lookup table, described below. In an embodiment, in each row, the value in the Node1 column is smaller than the value in the Node2 column. Values in the IsForward/IsBackward columns indicate the direction of the edges. If IsForward is 1, an edge exists from Node1 to Node2. If IsBackward is 1, an edge exists from Node2 to Node1. If IsForward and IsBackward are both 1, a bidirectional edge exists between Node1 and Node2. Score may be a positive integer, for example, between 1 and 64, which indicates the strength of the connection between the two entities. The text file may be compiled into a binary format. Other embodiments may utilize different table representations and formats.

TABLE 4

Content of an Entity Connection Text File

| Node1 (Source) | Node2 (Target) | IsForward | IsBackward | Score |
|---|---|---|---|---|
| 1 | 4 | 1 | 0 | 1 |
| 2 | 6 | 1 | 1 | 1 |
| 2 | 3 | 1 | 0 | 1 |
| 3 | 6 | 1 | 1 | 1 |

An exemplary entity property lookup table is depicted in Table 5, and is suitable for use with an embodiment of the present invention. In an embodiment, the entity property lookup table contains a mapping between an internal entity ID of an entity to its unique entity ID in an entity knowledge base, and the entity's name and types, as indicted by the column headings. To save space, entity types may be mapped into internal type IDs, and may be converted back into type names using a type name lookup table. In an embodiment, the mapping between type names and IDs is done such that more frequent types are represented using smaller integers. The entity connection lookup table may be compiled into a binary format from a text file. Other embodiments may utilize different table representations and formats.

TABLE 5

Entity Property Lookup Table

| InternalID | KnowledgeBaseID | Name | TypeIDs |
|---|---|---|---|
| 1 | 00ae7d77-8575-2593-874b-715205f01fb7 | Facebook | 40, 57, 172, 175, 225, 362, 733, 792 |
| 2 | 3b30aeb1-32ee-2dbf-e322-4e7c55beee2b | Wikipedia | 13, 57, 175, 362 |
| 3 | 18e2d27b-9353-3e41-276d-44d186a759dc | Breaking Bad | 1, 24, 44 |
| ... | ... | ... | ... |

When utilizing the non-overlapping longest match technique to identify mentions, in an embodiment the entity candidates for the same mention are considered mutually exclusive under the assumption that each mention refers to at most one entity. Therefore, there are no edges, or connections, between nodes for the same mention. Accordingly, a resultant graph would be an M-partite graph where M is the total number of mentions detected in the input (e.g., a document). (The assumption that each mention refers to at most one entity may be violated in practice, e.g., in directory pages which contain a list of different people with the same name. These are considered as corner cases and may be excluded from the design of the algorithm.)

Figure 5:
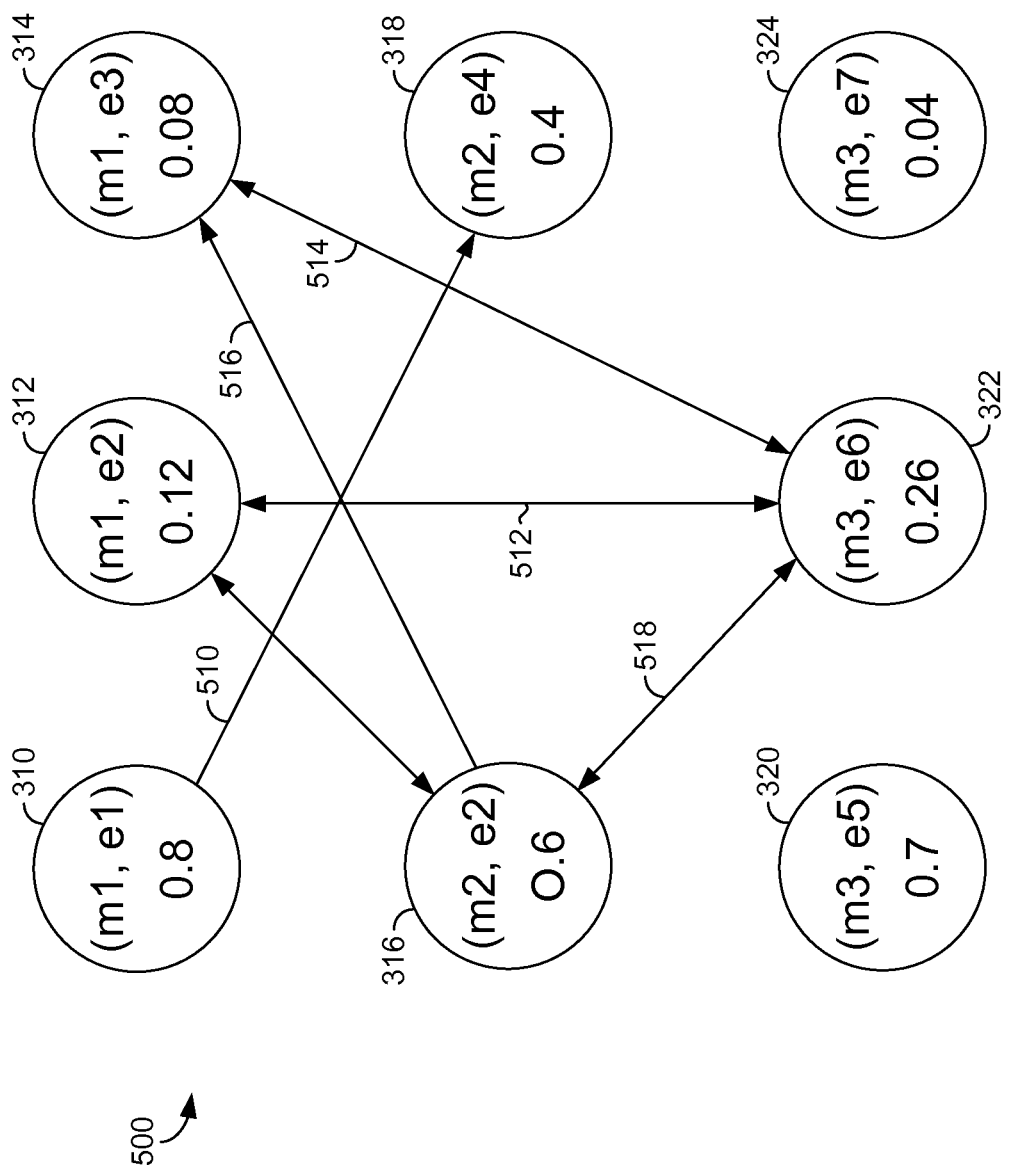

Referring now to FIG. 5, an exemplary graph with edges is depicted that is suitable for use with an embodiment of the present invention, and is designated generally as graph 500. Graph 500 is but one example of a suitable graph and is not intended to suggest any limitation as to the scope of use or functionality of invention embodiments. Neither should graph 500 be interpreted as having any dependency or requirement relating to any one or combination of components illustrated. As depicted, graph 500 includes nodes 310, 312, 314, 316, 318, 320, 322, and 324 from FIG. 3. Additionally, graph 500 depicts edges 510, 512, 514, 516, and 518.

The edges depicted in graph 500 represent the edges defined in Table 3 (Entity Connection Lookup Table). Edge 510 represents a connection from node 310 to 318, corresponding to edge <e1, e4> shown in Table 3. Edge 512 represents a bidirectional connection between nodes 312 and 322, corresponding to edges <e2, e6> and <e6, e2> shown in Table 3. Edge 514 represents a bidirectional connection between nodes 314 and 322, corresponding to edges <e3, e6> and <e6, e3> shown in Table 3. Edge 516 represents a connection from node 316 to 314, corresponding to edge <e2, e3> shown in Table 3. Edge 518 represents a bidirectional connection between nodes 316 and 322, corresponding to edges <e2, e6> and <e6, e2> shown in Table 3. Note that there is no edge from node 312 to node 314, even though Table 3 depicts the edge <e2, e3>. As explained above, there are no edges between nodes for the same mention based on the assumption that each mention refers to at most one entity.

When utilizing the overlapping longest match technique to identify matches, in an embodiment the graph edges would be constructed similarly as described above, except that all the nodes belonging to the same mention group would be considered mutually exclusive, again under the assumption that each mention refers to at most one entity. A resultant graph would be a G-partite graph where G is the total number of mention groups.

Entity Disambiguation by Graph Pruning

Referring again to FIG. 2, disambiguation element 214 performs entity disambiguation, i.e., determines whether a detected mention should be linked to any entity, and if so, which entity it should be linked to when the mention corresponds to multiple possible candidate entities. In an embodiment, entity disambiguation is achieved through an iterative greedy graph pruning procedure, which consists of the following steps:

1) Update node scores according to an algorithm utilizing the following formula:

Node score=Prior node score+α·ΣOutgoing edge score+β·ΣIcoming edge score

In an embodiment, the parameters α and β are selected based on a set of training documents that contain known, pre-labeled entities. The algorithm can be run on this training set to determine optimal values of the parameters. For example, in one embodiment a parameter scan may be performed in which the algorithm is run on the training set multiple times, varying the value of one or both parameters each time the algorithm is run to find parameter values for which the error rate is optimized or is below a threshold level.

2) Once the node scores have been updated, the nodes are sorted in descending order of their scores.

3) Nodes with scores above a preset cutoff threshold are selected, starting from the node with the highest score. Once a node is selected, other nodes that are mutually exclusive/ conflicting with the selected node are marked as inactive, and thus excluded from the selection process. Because the set of nodes corresponding to the same mention (or mention group) are considered mutually exclusive, if any node is selected within the set, all other nodes within the same set are marked as inactive. Nodes that are only connected to inactive nodes are considered inactive as well.

4) When the selection process is complete, the entities that correspond to the selected nodes have been disambiguated from the entities that were spotted in the document and are designated as output entities.

Entity Clustering and Ranking

In an embodiment, the output entities are clustered and ranked in order to identify the main topics of a document. With further reference to FIG. 2, entity clustering element 216 clusters the output entities. Entity clustering may be trivially performed by traversing the connected components in the pruned graph (based on edge connections). Alternatively, entity clustering may be done by grouping entities based on their types or categories. Other methods of clustering the entities may also be employed. After clustering, a unique cluster ID is assigned to each cluster. The clusters can provide valuable signals for entity ranking, since larger clusters usually capture more relevant topics in a page.

Entity ranking element 218 ranks the output entities. Ranking entities may be useful for prioritizing more relevant entities against less relevant entities. Identifying the main topic or topics of a document may be useful for presenting information to a user regarding the document, such as presenting or indicating a portion or all of the mentions and entities in a document to a user, or providing opportunities to perform tasks related to the main topic or topics of a document returned in search results, or indicating the relationships between entities in a document, among other things. For example, based on the cluster IDs described above, if a user selects an entity, other entities with the same cluster ID (i.e., in the same cluster) may be highlighted to help the user identify related entities in the document. Knowing the main topic of a document may also facilitate presenting a summary of the document to a user. For example, in one embodiment when a document is shown in a summary form (e.g., in a list of search results), only the main topics (and their associated applications) are displayed. In some embodiments all identified entities are presented. In other embodiments only a subset of entities is presented. Two exemplary ways in which the subset may be selected are 1) based on their relevancy to main topics of the document (as determined from main topic score, and 2) based on their associated applications (e.g., in some scenarios only entities related to a particular type of application are presented, such as only entities related to music applications or movie applications).

In an embodiment, entity ranking is based on a variety of information made available by the previous steps, such as the number of mentions of each entity, the position of mentions, inverse document frequencies (IDFs) of mentions, entity cluster sizes, etc. These signals may be combined into a machine-learned ranking function trained by supervised learning. In an embodiment, the ranking function assigns a main topic score to each entity based on signals such as the position and the number of times the entity is mentioned in the document. The entity or entities having scores higher than a preselected threshold will be considered as the main topic(s) of the document. Some documents may have multiple main topics (multiple entities have scores above the threshold), and some documents may not have a main topic (all entities have scores lower than the threshold).

Linking Entities with Actions/Applications

Knowing the entities associated with a document enables the linking of actions to the entities. In an embodiment, the knowledge repository stores associations between entities and actions that may be performed on the entities. For example, a document may contain references to songs and music albums. Actions relevant to songs and music albums might include "download," "play," "purchase," and so forth.

Thus, the knowledge repository might store indications of "download," "play," and "purchase" as actions relevant to a "song" entity. And indications of those actions may be stamped on the document in association with a song entity.

Additionally, the knowledge repository may store associations between actions and various applications that perform the actions. For example, the action of playing a song might be performed by applications such as Xbox Music, QuickTime, iTunes, or RealPlayer. As with the entity linking described above, the associations of entities with actions and applications may be performed "offline," i.e., independently of users' search queries. The knowledge repository may be a collection of separate databases and/or tables that store the various relationships between mentions, candidate entities, entity properties, actions, applications, and so forth. The knowledge repository may also be implemented as a single database, or other combinations of databases and/or tables.

Real Time Serving

In an embodiment, the associations of entities and relevant actions for documents in a web index enables a user performing a search query to be presented with actions and applications relevant to the search results in real time. For example, in response to a user query for "romantic songs," which has strong music intent, the search results may include, for each web page in the top search results, a list of songs mentioned in the webpage. The list of songs may be presented as, or in conjunction with, links to play each song directly, add all the songs to an Xbox Music play list, and so forth. There may be multiple applications capable of performing a particular action, such as playing a song. The particular application that is linked may be selected based on metadata such as the type of software or applications installed on the user's device, the type of user device, and user preferences, among others. An exemplary search result page including links to relevant applications is shown in FIG. 6.

Figure 6:
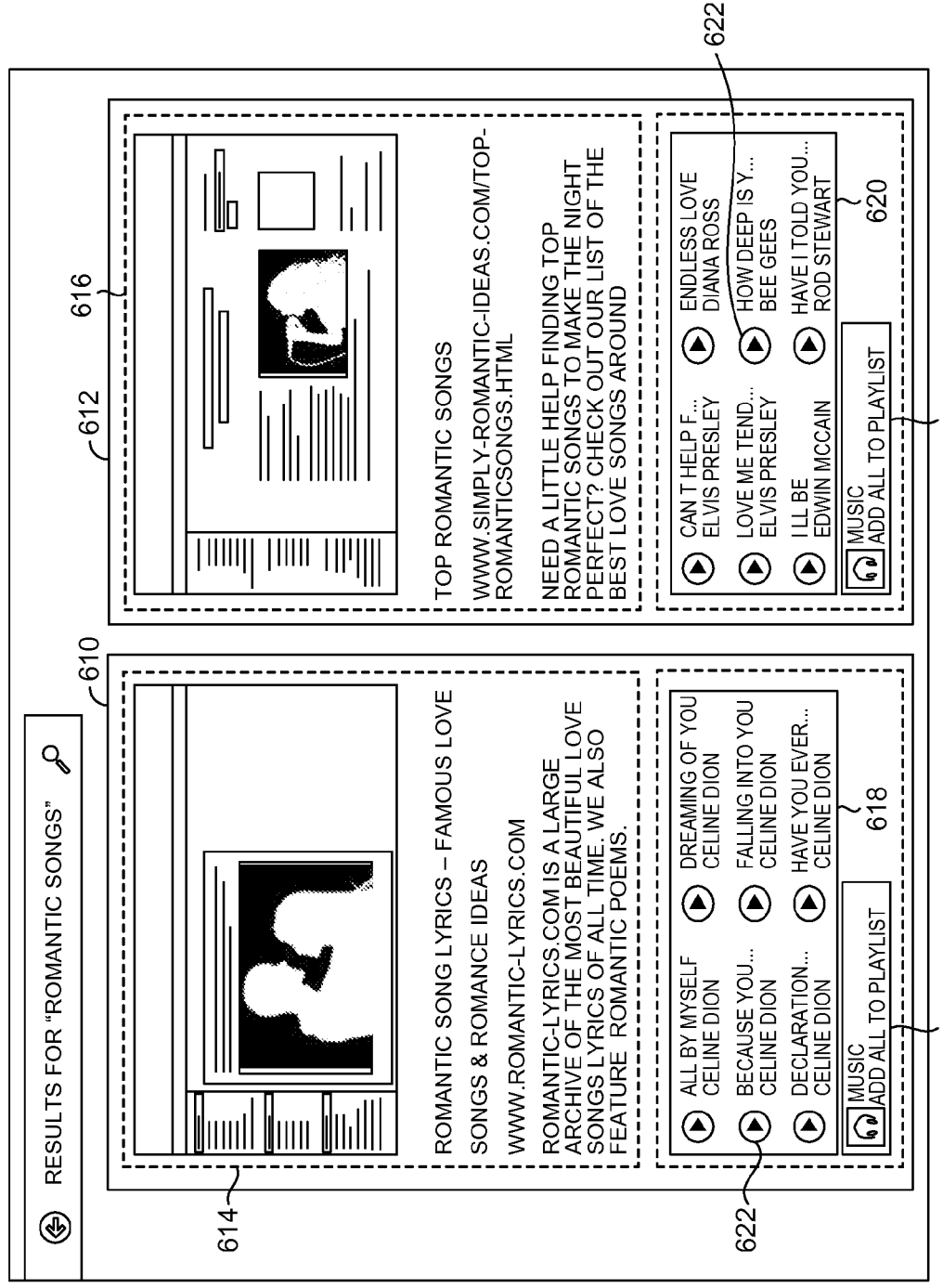
FIG. 6 is a block diagram depicting an exemplary serving workflow suitable for use with an embodiment of the present invention.

With reference to FIG. 6, the exemplary search result page depicted is suitable for use with an embodiment of the present invention, and is designated generally as search result page 600. Search result page 600 is but one example of a suitable search result page and is not intended to suggest any limitation as to the scope of use or functionality of invention embodiments. Neither should search result page 600 be interpreted as having any dependency or requirement relating to any one or combination of components illustrated. As depicted, search result page 600 includes a search result 610 and a search result 612. As depicted, search result 610 represents a web page at a web address "www.romantic-lyrics.com," and presents a summary 614 of the web page. Search result 612 represents a web page at a web address "www.simply-romantic-ideas.com/top-romantic-songs.html," and presents a summary 616 of the web page. In addition to displaying summaries of the web pages, in an embodiment the search results 610 and 612 also include a list of album tracks 618 and 620, respectively, contained in each web page. Next to each album track is presented an icon 622 linking to an application that will play the associated track. Also presented is an icon 624 linking to an application that will add the album tracks in the respective search result to an Xbox playlist. Other types of links may be presented in addition to, or instead of, the links to a music player. For example, a link might be presented to an application that opens documents containing song lyrics corresponding to the album tracks.

Entity/Action Linking System Overview

Figure 7:
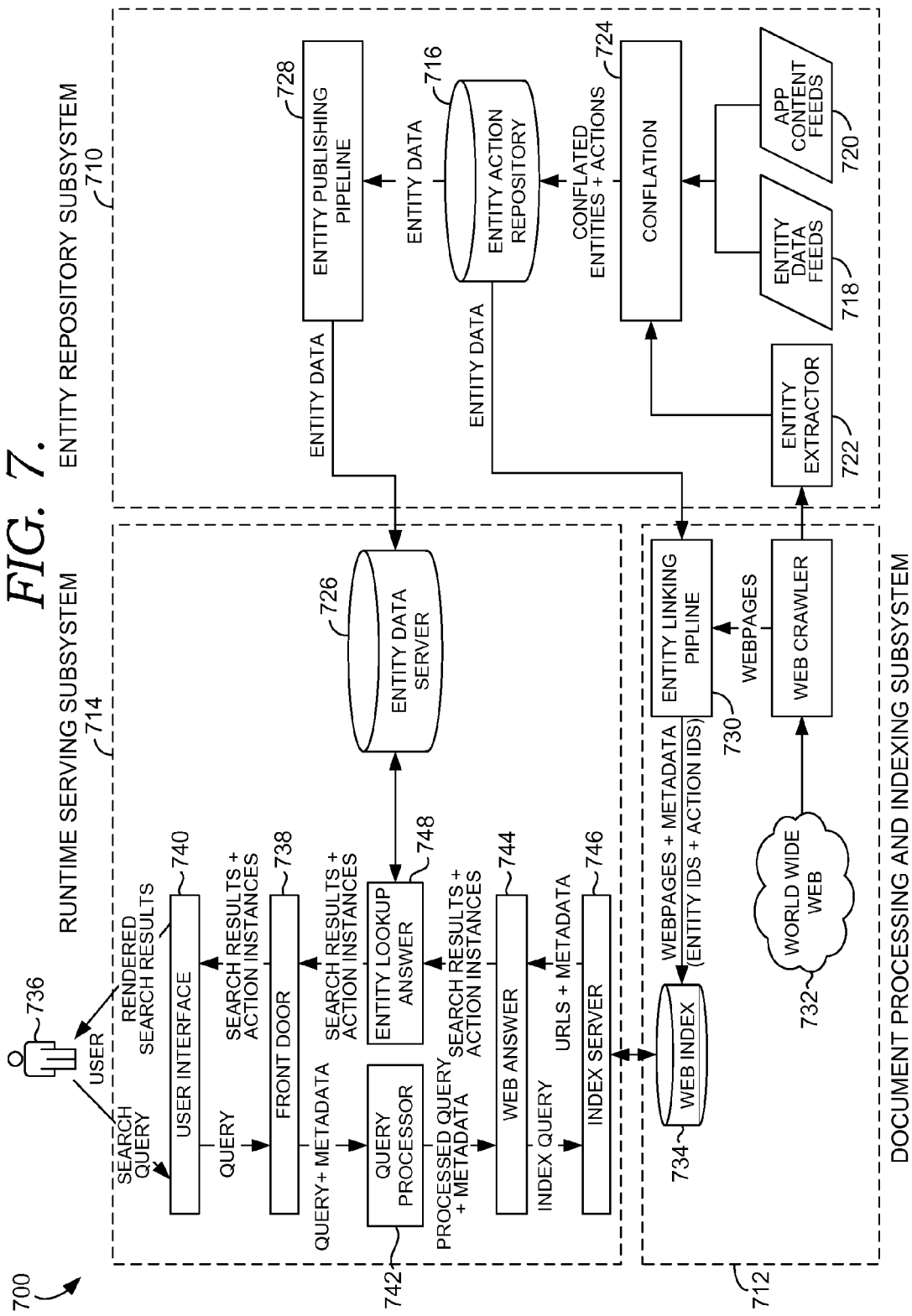
FIGS. 7-10 are flowcharts of exemplary methods that are suitable for use with exemplary embodiments of the present invention.

With reference to FIG. 7, an exemplary entity/action linking system is depicted that is suitable for use with an embodiment of the present invention, and is designated generally as system 700. System 700 is but one example of a suitable system and is not intended to suggest any limitation as to the scope of use or functionality of invention embodiments. Neither should system 700 be interpreted as having any dependency or requirement relating to any one or combination of components illustrated. As depicted, system 700 includes three subsystems: an entity repository subsystem 710, a document processing and indexing subsystem 712, and a runtime serving subsystem 714. The entity repository subsystem 710 and the document processing and indexing subsystem 712 operate in offline mode (i.e., independent of user queries). The runtime serving subsystem 714, which runs in online mode, responds to user queries in real-time.

Entity Repository Subsystem

In an embodiment, entity repository subsystem 710 constructs an entity repository 716 containing known entities, their relationships, and properties. Entity repository 716 may be organized as a triplestore of entities, relationships, and properties. Entity repository 716 may also include actions that are stored as a special type of entity and are connected to their associated entities as properties. In an embodiment, entity repository 716 is constructed by ingesting and conflating information about entities and actions from multiple data sources. The data sources may include various feeds, such as entity data feeds 718 and application content feeds 720 from entity/application data providers, as well as entities and facts extracted from the World Wide Web, depicted as extracted entities 722. A conflation process 724 merges the information about the same entity from different data sources and converts them into a unified representation.

For example, there may be multiple data providers for music entities including application content providers such as Xbox Music, Spotify, and iTunes, as well as generic data providers such as Wikipedia and Freebase. Each data provider may provide different aspects of the same entity (album, track or artist), different actions, and different protocols to perform these actions in various software platforms and devices. In an embodiment, conflation process 724 determines when entities received from different providers are the same entity, and then consolidates them into one single entity with a unique identifier (i.e., entity ID) and a list of actions and other properties.

After conflation, the conflated entity data may be stored in entity repository 716 as a list of subject-predicate-object triples. The triples may be further processed and converted into various other formats. The entity data are published into an entity data server 726 through an entity publishing pipeline 728. In an embodiment, entity data server 726 is part of runtime serving subsystem 714, and is a key-value store that allows real-time lookup of entity data using entity IDs.

Document Processing and Indexing Subsystem

In an embodiment, the conflated entities in entity repository 716 are periodically published to an entity linking pipeline 730 in document processing and indexing subsystem 712. Entity linking pipeline 730 runs an entity linking algorithm to recognize dominant and other mentioned entities in documents after they are crawled from the World Wide Web 732. In an embodiment, entity linking pipeline 730 implements the entity linking algorithm described above with regard to DU pipeline 200. After entity linking, unique identifiers of relevant entities and their associated actions may be "stamped" onto the corresponding documents and published into a web index 734. The entities and associated actions may then be retrieved at query time based on the intent of user queries.

Runtime Serving Subsystem

In an embodiment, runtime serving subsystem 714 processes search queries received from a user 736, retrieves search results, and then presents them back to user 736. The runtime serving workflow may include the following stages. A front door 738 receives a user query via a user interface 740 and attaches additional metadata such as the user's market settings, location information, information about the user's platform, e.g., type of device, device capabilities, installed applications, and so forth. Other metadata may also be attached. In an embodiment, front door 738 includes one or more servers that communicate with a client-side application, such as user interface 740. A query processor 742 hosts a pool of query intent classifiers and annotators. The query intent classifiers classify the query received from front door 738 into one or more intent classes, such as navigational, informational, music queries, movie queries, people queries, and so on. The query annotators differ from classifiers in that they do not classify the full query, but annotate subparts of the query with additional information such as phrase boundaries and importance, entity types and/or IDs. A web answer 744 receives a processed query from query processor 742 and further transforms it to an internal query language and sends it to an index server 746. Index server 746 returns a list of search results to web answer 744 in response to the query. The search results may include document URLs and associated metadata, including the title, snippet, thumbnail, and a list of related entity and action IDs. An entity lookup answer 748 receives the search results and populates a list of action instances for each search result by calling entity data server 726. The action instances are based on the entity and action IDs embedded in each search result as well as the user's platform, market and other metadata. For example, suppose a search result contains a list of song IDs associated with a play_audio_action. In an embodiment, entity lookup answer 748 retrieves the entity data corresponding to the song IDs and populates a play_audio_action instance based on the user's platform settings. The action instance will include an application ID, launch arguments to be passed to the application, and any additional information necessary for performing the action. Entity lookup answer 748 sends the search results and action instances to front door 738, which renders the returned search results and action instances and presents them to user 736 via user interface 740.

Real Time Entity Linking

In some embodiments, entity linking is performed in real time while a user is generating a document. For example, versions of document understanding pipeline 200 and entity/action linking system 700 may run locally on a user's machine, such that while the user is typing or entering data into a document, entities are automatically recognized in real time within the text that the user types, based on surrounding text and other contextual information, and suggest related actions that the user can take. As an example, while a user is typing an article in Office Word, the entity/action linking system may detect that an address or company name is typed, and present a contacts menu that allows the user to insert some actual details related to the entities that are recognized, e.g., the address or company name. If the entity is a company name, a menu might be presented in real time allowing the user to insert a stock ticker, an image related to the company, or other data or actions related to the company. In an embodiment, an optional server-side entity linking component could be utilized in conjunction with the entity linking system on the user's machine, to provide the capability to recognize a much larger pool of entities than may be possible on the client side due to memory limitations of the user's machine.

Figure 8:
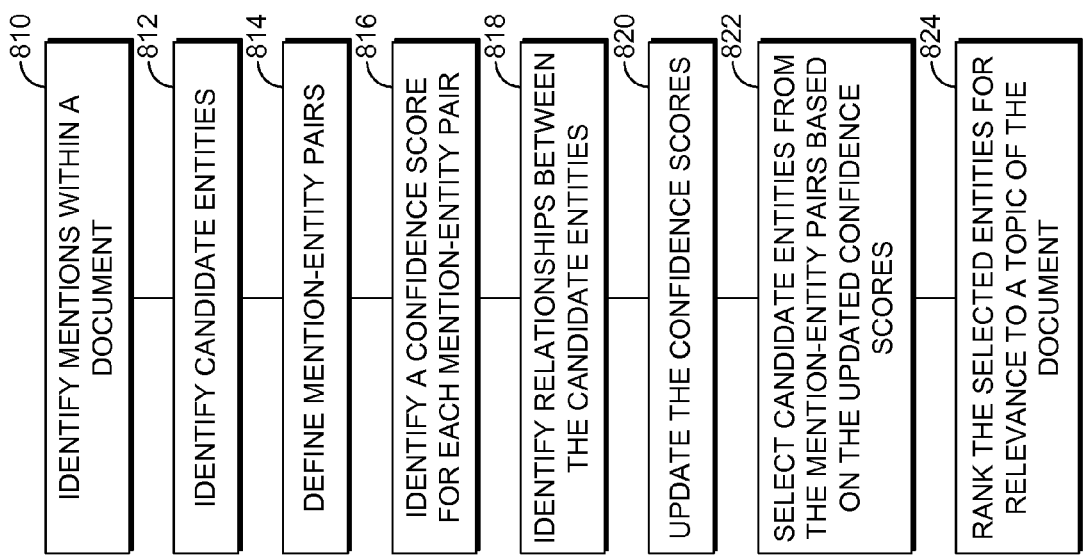

Referring now to FIG. 8, a flowchart depicts an exemplary method suitable for use with an embodiment of the present invention, and is generally referred to as method 800. Method 800 is but one example of a suitable method and is not intended to suggest any limitation as to the scope of use or functionality of invention embodiments. Neither should method 800 be interpreted as having any dependency or requirement relating to any one or combination of components illustrated.

At step 810, mentions of entities within a document are identified. In an embodiment, the mentions are identified in a manner similar to that described above with regard to node construction element 210 in FIG. 2, i.e., utilizing either or both of a non-overlapping longest match technique or an overlapping longest match technique. However, some embodiments may utilize variations of those or other mention spotting techniques. At step 812, candidate entities associated with each mention are identified. In an embodiment, the candidate entities are identified from a knowledge repository, which stores a list of entities, indicates relationships between entities, and indicates actions associated with entities. In an embodiment, the candidate entities are identified in a manner similar to that described above with regard to node construction element 210 in FIG. 2, i.e., utilizing a mention-entity lookup table that maps entity mentions to possible entity candidates to which the mentions may refer. Some embodiments may utilize variations of a mention-entity lookup table or other techniques for identifying candidate entities.

At step 814, mention-entity pairs are defined for each mention and the mention's associated candidate entities. At step 816, a confidence score is identified for each mention-entity pair. In an embodiment, the confidence score indicates a conditional prior probability that the mention in the mention-entity pair refers to the candidate entity in the mention-entity pair. In an embodiment, the mention-entity pairs and their associated confidence scores are stored in the mention-entity lookup table, as described above with regard to node construction element 210 in FIG. 2. However, some embodiments may utilize variations of the mention-entity lookup table or other techniques for identifying the mention-entity pairs and their associated confidence scores. At step 818, relationships between the candidate entities are identified. In an embodiment, a graph is defined, or constructed, based on the mention-entity pairs and the relationships between the candidate entities. In an embodiment, an entity connection lookup table may be utilized to identify the relationships, in a manner similar to that described above with regard to node construction element 210 in FIG. 2. However, some embodiments may utilize variations of the entity connection lookup table or other techniques for identifying the relationships between candidate entities.

At step 820, the confidence score for each mention-entity pair is updated based on the relationships between the associated candidate entity and the candidate entities associated with other mention-entity pairs. In an embodiment, updating the confidence score is based at least in part on the strengths of the relationships. In an embodiment, the scores are updated in a manner similar to that described above with regard to entity disambiguation by graph pruning. Some embodiments may utilize variations of graph pruning or other techniques to update the confidence scores. At step 822, candidate entities are selected from the mention-entity pairs based on the updated confidence scores. The candidate entities may be selected based on having updated confidence scores above a predetermined threshold. In an embodiment, as each candidate entity is selected, other mention-entity pairs are marked as inactive if they are mutually exclusive with the mention entity-pair that corresponds to the selected candidate entity. The inactive mention-entity pairs are excluded from the selection process. At step 824, the selected entities are ranked, such that ranking indicates the relevance of the selected entities to a topic of the document, such as the main topic or one of several important topics, and so forth.

In an embodiment, actions are identified that are associated with an entity from the ranked entities. The actions may be identified by accessing the knowledge repository. An intent is determined for a search query that generated search results that include the document that contains the mentions that were identified. An action may be selected from the identified actions, based on the intent of the user query, and a link may be presented within the search results to an application that performs the action.

Figure 9:
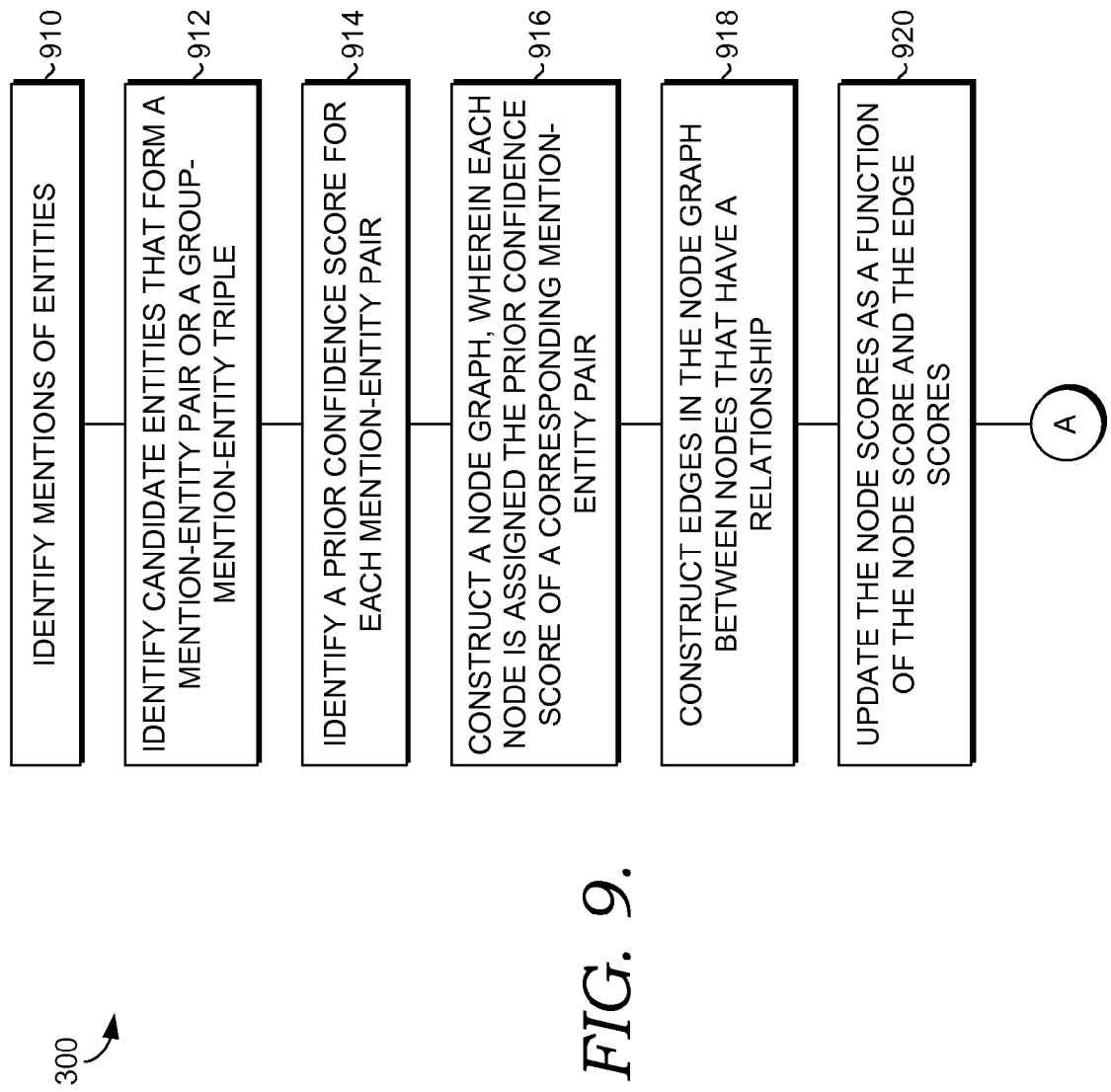
Figure 9:
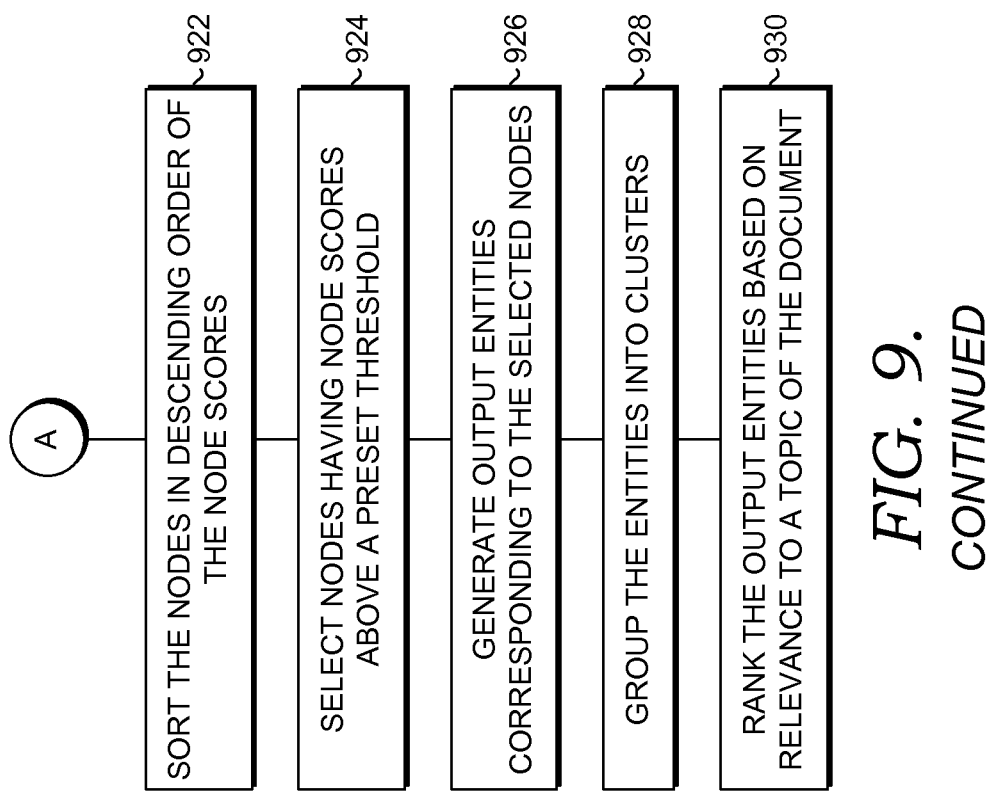

Referring now to FIG. 9, a flowchart depicts an exemplary method suitable for use with an embodiment of the present invention, and is generally referred to as method 900. Method 900 is but one example of a suitable method and is not intended to suggest any limitation as to the scope of use or functionality of invention embodiments. Neither should method 900 be interpreted as having any dependency or requirement relating to any one or combination of components illustrated.

At step 910, mentions of entities within a document are identified. In an embodiment, the mentions are identified in a manner similar to that described above with regard to node construction element 210 in FIG. 2, i.e., utilizing either or both of a non-overlapping longest match technique or an overlapping longest match technique. Variations of those or other mention spotting techniques may also be utilized. At step 912, candidate entities corresponding to each mention are identified, such that for each mention and corresponding candidate entity, the mention and the corresponding candidate entity form a mention-entity pair. In an embodiment, the candidate entities are identified based on a pre-compiled mention-entity mapping that maps mentions to possible entity candidates. Some embodiments may use variations of the mention-entity mapping or other techniques for identifying candidate entities. When an overlapping matching technique was utilized to identify the mentions, then overlapping consecutive mentions form a mention group, such that for each mention group and corresponding mention-entity pair, the mention group and the corresponding mention-entity pair form a group-mention-entity triple. At step 914, a prior confidence score for each mention-entity pair is identified. In an embodiment, the prior confidence score for each mention-entity pair is identified based on the pre-compiled mention-entity mapping that stores the prior confidence score for each mention-entity pair. Other methods for identifying the prior confidence scores may also be used. At step 916, a graph is constructed such that each node in the graph corresponds to a mention-entity pair or a group-mention-entity triple, and each node is assigned the prior confidence score of the corresponding mention-entity pair as a node score. At step 918, edges are constructed in the graph between nodes that have relationships between each other. The relationships between nodes correspond to relationships between the candidate entities in the mention-entity pairs. In an embodiment, an entity connection lookup table may be utilized to identify the relationships, in a manner similar to that described above with regard to node construction element 210 in FIG. 2. Other methods for identifying the relationships between candidate entities may also be utilized. The edges may be directional, such that an edge from a first node to a second node indicates that an occurrence of a first candidate entity associated with the first node increases the likelihood that an occurrence of a second entity associated with the second node is related to the first candidate entity. In an embodiment, the edges are not constructed between nodes that share the same mention or between nodes that are in the same mention group. Each edge is assigned an edge score, which may represent the strength of the relationship between nodes. At step 920, the node score for each node is updated as a function of the node score and the edge scores of incoming and outgoing edges for the node. In an embodiment, the node scores are updated utilizing the formula:

$$\text{node score} = \text{prior node score} + \alpha \cdot \Sigma \text{outgoing edge scores} + \beta \cdot \Sigma \text{incoming edge scores},$$

where $\alpha$ and $\beta$ are selectable parameters. The parameters $\alpha$ and $\beta$ may be selected based on a training set of documents. Some embodiments may use variations of the formula or other formulas to update the node scores. At step 922, the nodes are sorted in descending order of their node scores, thus providing a sorted list of nodes. At step 924, nodes having node scores above a preset threshold are selected, starting from the node having the greatest node score and proceeding through the list of sorted nodes in the direction of decreasing scores. As each node is selected, any nodes that are mutually exclusive with the selected node are eliminated from the list, or marked as inactive, such that they are excluded from the selection process. At step 926, output entities are generated that correspond to the selected nodes. At step 928, the output entities are grouped into clusters. At step 930, the output entities are ranked based on relevance to a topic of the document. In an embodiment, actions are identified that are associated with a first entity from among the output entities. The actions may be identified based on a pre-compiled mapping between known entities and their associated actions. An intent is determined for a search query that generated a search result that includes the document that contains the mentions that were identified. An action is selected from the identified actions, based on the intent of the search query, and a link may be presented within the search result to an application that performs the action.

Figure 10:
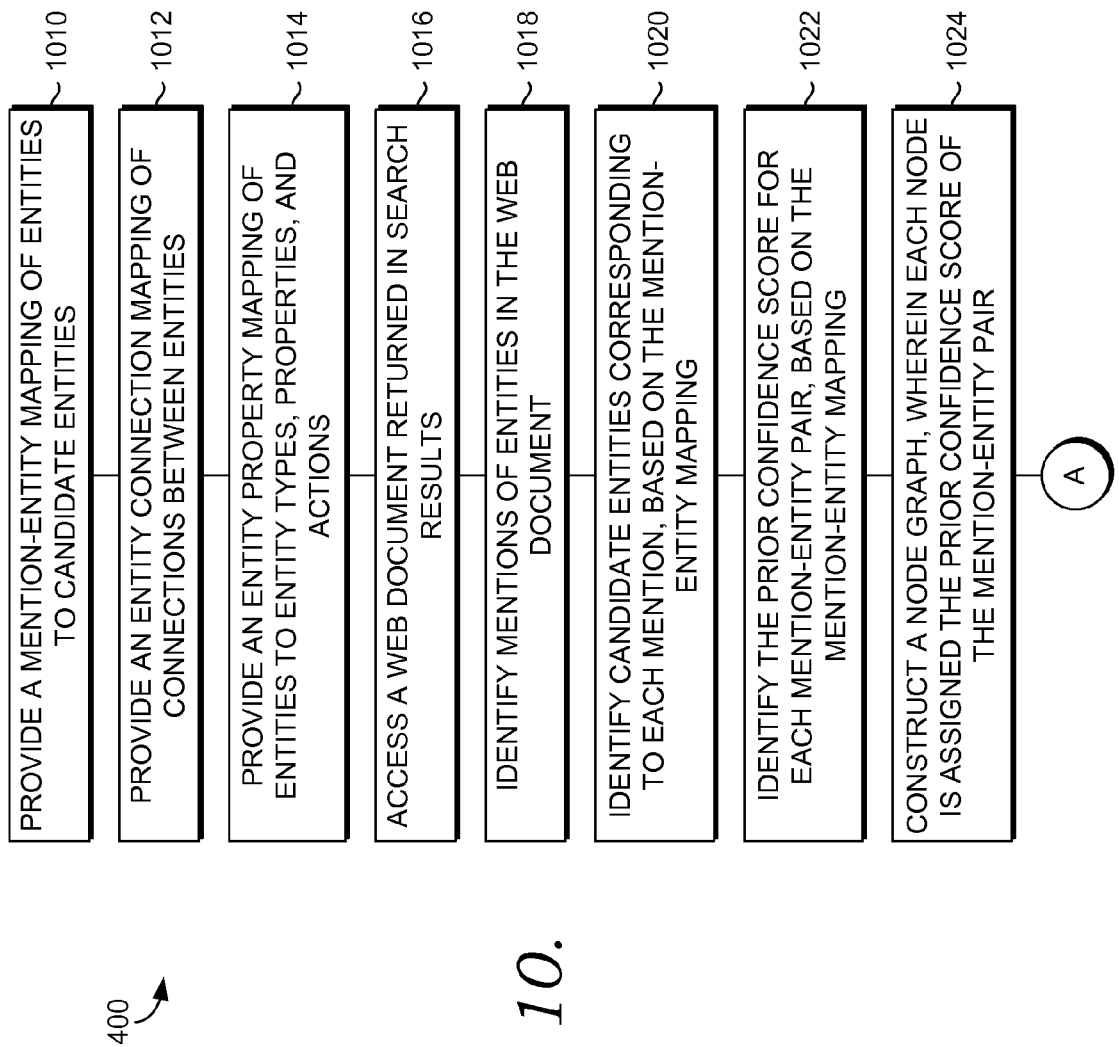
Figure 10:
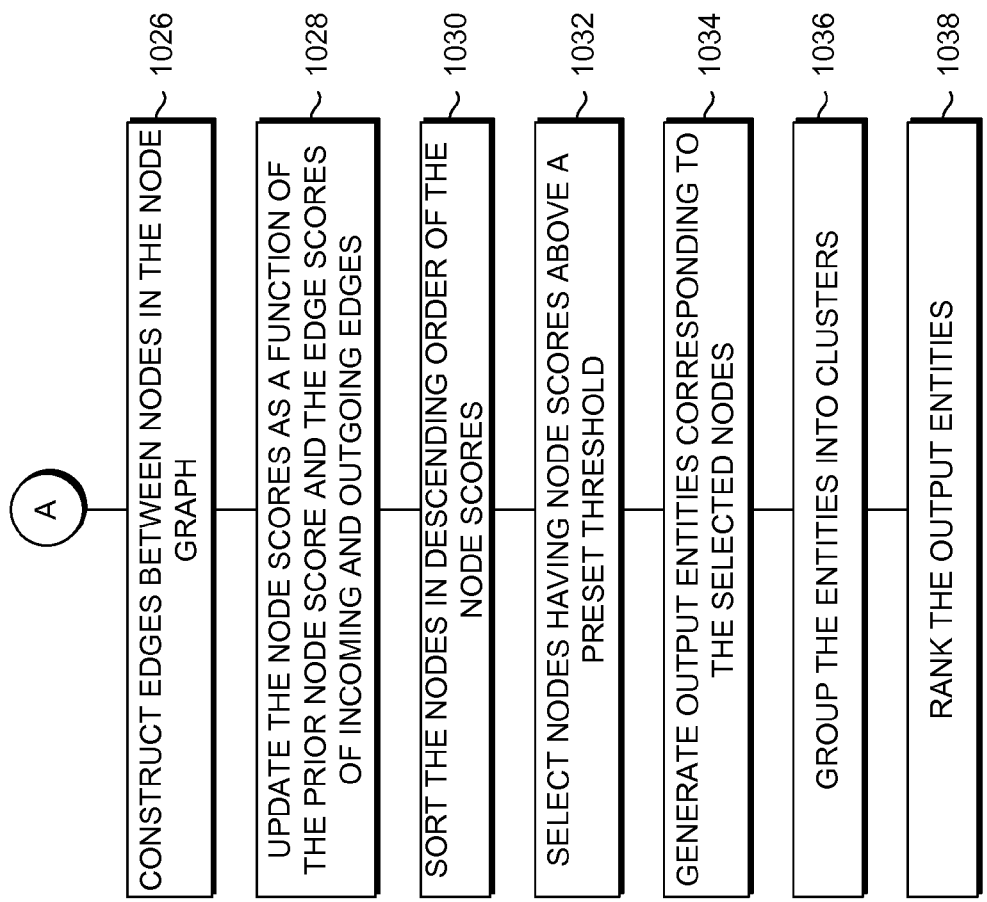

Referring now to FIG. 10, a flowchart depicts an exemplary method suitable for use with an embodiment of the present invention, and is generally referred to as method 1000. Method 1000 is but one example of a suitable method and is not intended to suggest any limitation as to the scope of use or functionality of invention embodiments. Neither should method 1000 be interpreted as having any dependency or requirement relating to any one or combination of components illustrated.

At step 1010, a mention-entity mapping is provided that maps mentions of entities to possible candidate entities to which the mentions may refer. An association between a mention and a candidate entity forms a mention-entity pair, and the mention-entity mapping associates a prior confidence score for each mention-entity pair. The confidence score represents the probability that the mention refers to the entity in the mention-entity pair. At step 1012, an entity connection mapping is provided that identifies connections between entities that represent relationships between the entities. At step 1014, an entity property mapping is provided that maps entities to entity types, properties of the entities, and actions associated with, or that may be performed on, the entities.

At step 1016, a document that was returned in search results is accessed. In an embodiment, the document may be a web document that was returned in response to a web search. However, the document is not limited to being a web document, nor is the search limited to being a web search. At step 1018, mentions of entities in the document are identified. In an embodiment, one or both of a non-overlapping longest match technique or an overlapping longest match technique may be employed to identify the mentions, as described above with regard to node construction element 210 in FIG. 2. Some embodiments may utilize variations of those techniques or other mention spotting techniques. At step 1020, candidate entities corresponding to each mention are identified, based on the mention-entity mapping. A mention-entity lookup table may be utilized that maps entity mentions to possible entity candidates to which the mentions may refer, such as described above with regard to node construction element 210 in FIG. 2. Alternative techniques for identifying candidate entities may also be utilized. At step 1022, the prior confidence score is identified for each mention-entity pair associated with the identified mentions, based on the mention-entity mapping.

At step 1024, a graph is constructed such that each node corresponds to a mention-entity pair, and each node is assigned the prior confidence score of the mention-entity pair as a node score. At step 1026, edges are constructed in the graph between two or more nodes that share different mentions. Each edge represents a connection, or relationship, between nodes in the graph, and each edge is assigned an edge score that represents the strength of the connection. In an embodiment, the connections between nodes in the graph correspond to connections between the candidate entities in the mention-entity pairs as indicated by the entity connection mapping. The entity connection mapping may be similar to the entity connection lookup table described above with regard to node construction element 210 in FIG. 2.

At step 1028, the node score for each node is updated as a function of the prior node score and the edge scores of incoming and outgoing edges for the node. In an embodiment, the node scores are updated in a manner similar to that described above with regard to entity disambiguation by graph pruning. Some embodiments may utilize variations of graph pruning or other methods to update the node scores. At step 1030, the nodes are sorted in descending order of the node scores to provide a sorted list of nodes. At step 1032, nodes having node scores above a preset threshold are selected, starting from the node having the greatest node score and proceeding through the list of sorted nodes in the direction of decreasing scores. As each node is selected, nodes that are mutually exclusive with the selected node are eliminated from the list of nodes, or marked as inactive, such that they are excluded from the selection process. In an embodiment, nodes that share the same mention are determined to be mutually exclusive.

At step 1034, output entities are generated. The entities that correspond to the selected nodes are designated as the output entities. At step 1036, the output entities are grouped into clusters. The grouping may be performed by one or both of traversing the connected components in the pruned graph (based on edge connections), or grouping based on entity types or categories. Other techniques for grouping the entities into clusters may also be utilized. The entity clusters may be utilized to determine the main topic or topics contained in the document. For example, larger clusters may represent the topics that are most important or most relevant to the document. At step 1038, the output entities are ranked. The ranking may be based on the entities' relevance to the main topic or topics contained in the document. In an embodiment, actions are identified that are associated with a first entity from the output entities. An intent is determined for a search query that generated the search results that include the document. An action is selected from the identified actions, based on the intent of the search query. A link may be presented within the search results to an application that performs the action.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer storage media having embodied thereon computer-usable instructions that, when executed, perform a method of entity linking, comprising:
   identifying mentions of entities within a document;
   identifying candidate entities associated with each mention;
   defining mention-entity pairs for each mention and the associated candidate entities;
   identifying a confidence score for each mention-entity pair;
   identifying relationships between the candidate entities;
   for each mention-entity pair, updating the confidence score based on the relationships between the associated candidate entity and the candidate entities associated with other mention-entity pairs;
   selecting candidate entities from the mention-entity pairs based on the updated confidence scores; and
   ranking the selected entities, wherein the ranking indicates a relevance of the selected entities to a topic of the document.

2. The media of claim 1, wherein the candidate entities are identified from a knowledge repository, wherein the knowledge repository stores a list of entities, indicates relationships between entities, and indicates actions associated with entities.

3. The media of claim 1, wherein the confidence score indicates a conditional prior probability that the mention in the mention-entity pair refers to the candidate entity in the mention-entity pair.

4. The media of claim 1, further comprising defining a graph based on the mention-entity pairs and the relationships between the candidate entities.

5. The media of claim 4, wherein updating the confidence score for each mention-entity pair based on the relationships includes updating the confidence score based on the strengths of the relationships.

6. The media of claim 1, wherein selecting candidate entities based on the updated confidence scores includes selecting candidate entities having updated confidence scores above a predetermined threshold.

7. The media of claim 1, the method further comprising as each candidate entity is selected, eliminating any mention-entity pairs that are mutually exclusive with the mention entity-pair that corresponds to the selected candidate entity.

8. The media of claim 2, further comprising:
   identifying actions associated with a first entity from the ranked entities, wherein the actions are identified by accessing the knowledge repository;
   determining an intent of a search query that generated search results that include the document;
   selecting an action from the identified actions, based on the intent of the user query;
   presenting a link, within the search results, to an application that performs the action.

9. One or more computer storage media having embodied thereon computer-usable instructions that, when executed, perform a method of entity linking, comprising:

identifying mentions of entities within a document;
identifying candidate entities corresponding to each mention, wherein for each mention and corresponding candidate entity, the mention and the corresponding candidate entity form a mention-entity pair, and wherein when an overlapping matching technique was utilized to identify the mentions, then overlapping consecutive mentions form a mention group, wherein for each mention group and corresponding mention-entity pair, the mention group and the corresponding mention-entity pair form a group-mention-entity triple;
identifying a prior confidence score for each mention-entity pair;
constructing a graph, wherein each node corresponds to a mention-entity pair or a group-mention-entity triple, and wherein each node is assigned the prior confidence score of a corresponding mention-entity pair as a node score;
constructing edges in the graph between nodes that have relationships between each other, wherein the relationships between nodes correspond to relationships between the candidate entities in the mention-entity pairs, and wherein each edge is assigned an edge score;
for each node, updating the node score as a function of the node score and the edge scores of incoming and outgoing edges for the node;
sorting the nodes in descending order of the node scores;
selecting nodes according to a selection process, wherein nodes having node scores above a preset threshold are selected, starting from the node having the greatest node score, wherein as each node is selected, any nodes that are mutually exclusive with the selected node are eliminated from the selection process;
generating output entities corresponding to the selected nodes;
grouping the output entities into clusters; and
ranking the output entities based on relevance to a topic of the document.

10. The media of claim 9, wherein candidate entities corresponding to each mention are identified based on a pre-compiled mention-entity mapping that maps mentions to possible entity candidates.

11. The media of claim 10, wherein the prior confidence score for each mention-entity pair is identified based on the pre-compiled mention-entity mapping that stores the prior confidence score for each mention-entity pair.

12. The media of claim 9, wherein the edges are not constructed between nodes that share the same mention or between nodes that are in the same mention group, and wherein the edge scores represent strengths of the relationships between nodes.

13. The media of claim 12, wherein the edges are directional, such that an edge from a first node to a second node indicates that an occurrence of a first candidate entity associated with the first node increases the likelihood that an occurrence of a second entity associated with the second node is related to the first candidate entity.

14. The media of claim 13, wherein updating the node score includes utilizing the formula:

$$\text{node score} = \text{prior node score} + \alpha \cdot \Sigma \text{outgoing edge scores} + \beta \cdot \Sigma \text{incoming edge scores},$$

wherein $\alpha$ and $\beta$ are selectable parameters.

15. The media of claim 14, wherein $\alpha$ and $\beta$ are selected based on a training set of documents.

16. The media of claim 9, further comprising:
identifying actions associated with a first entity from the output entities;
determining an intent of a search query that generated a search result that includes the document;
selecting an action from the identified actions, based on the intent of the search query; and
presenting a link, within the search result, to an application that performs the action.

17. A method of entity linking, comprising:
providing a mention-entity mapping that maps mentions of entities to possible candidate entities, wherein an association between a mention and a candidate entity forms a mention-entity pair, and wherein the mention-entity mapping associates a prior confidence score for each mention-entity pair;
providing an entity connection mapping that identifies connections between entities;
providing an entity property mapping that maps entities to entity types, properties, and actions;
accessing a document returned in search results;
identifying mentions of entities in the document;
identifying candidate entities corresponding to each mention, based on the mention-entity mapping;
identifying the prior confidence score for each mention-entity pair associated with the identified mentions, based on the mention-entity mapping;
constructing a graph, wherein each node corresponds to a mention-entity pair, and wherein each node is assigned the prior confidence score of the mention-entity pair as a node score;
constructing edges in the graph between two or more nodes that share different mentions, wherein each edge represents a connection between nodes in the graph, and wherein each edge is assigned an edge score that represents strength of the connection;
for each node, updating the node score as a function of the prior node score and the edge scores of incoming and outgoing edges for the node;
sorting the nodes in descending order of the node scores;
selecting nodes according to a selection process, wherein nodes having node scores above a preset threshold are selected, starting from the node having the greatest node score, wherein as each node is selected, any nodes that are mutually exclusive with the selected node are eliminated from the selection process;
generating output entities corresponding to the selected nodes;
grouping the output entities into clusters; and
ranking the output entities.

18. The method of claim 17, wherein the connections between nodes in the graph correspond to connections between the candidate entities in the mention-entity pairs as indicated by the entity connection mapping.

19. The method of claim 17, wherein nodes that share the same mention are determined to be mutually exclusive.

20. The method of claim 17, further comprising:
identifying actions associated with a first entity from the output entities;
determining an intent of a search query that generated the search results that include the document;
selecting an action from the identified actions, based on the intent of the search query; and
presenting a link, within the search results, to an application that performs the action.

* * * * *